(12) United States Patent
Allen et al.

(10) Patent No.: US 7,171,822 B2
(45) Date of Patent: Feb. 6, 2007

(54) AIR CONDITIONING SYSTEM WITH INTERIOR AND EXTERIOR ASSEMBLIES

(75) Inventors: Kendall E. Allen, Ruther Glen, VA (US); Ralph G. Bailey, Richmond, VA (US)

(73) Assignee: Dometic Environmental Corporation, Pompano Beach, FL (US)

( * ) Notice: Subject to any disclaimer, the term of this patent is extended or adjusted under 35 U.S.C. 154(b) by 2 days.

(21) Appl. No.: 10/927,937

(22) Filed: Aug. 27, 2004

(65) Prior Publication Data

US 2005/0198984 A1    Sep. 15, 2005

Related U.S. Application Data

(60) Provisional application No. 60/551,694, filed on Mar. 10, 2004.

(51) Int. Cl.
F25D 19/02 (2006.01)
(52) U.S. Cl. .................................................. 62/298
(58) Field of Classification Search ............... 62/77, 62/298
See application file for complete search history.

(56) References Cited

U.S. PATENT DOCUMENTS

| | | | |
|---|---|---|---|
| 2,828,759 A * | 4/1958 | Gerhart, Jr. ............... | 137/74 |
| 2,903,004 A * | 9/1959 | Gerteis ..................... | 137/74 |
| 3,493,002 A * | 2/1970 | Brugler et al. ............ | 137/74 |
| 3,882,688 A * | 5/1975 | Honnold, Jr. ............. | 62/77 |
| 4,321,797 A * | 3/1982 | Yaeger et al. ............. | 62/79 |
| 4,674,294 A | 6/1987 | D'Agaro | |
| 4,762,170 A | 8/1988 | Nijjar et al. | |
| 4,825,663 A | 5/1989 | Nijjar et al. | |
| 4,945,977 A | 8/1990 | D'Agaro | |
| 4,947,657 A | 8/1990 | Kalmbach | |
| 5,333,678 A | 8/1994 | Mellum et al. | |
| 5,899,081 A | 5/1999 | Evans | |
| 6,009,715 A * | 1/2000 | Sakurai et al. ............ | 62/197 |
| 6,269,840 B1 * | 8/2001 | Beaver ..................... | 137/637.4 |
| 6,662,587 B2 * | 12/2003 | Rembold et al. .......... | 62/292 |
| 6,854,277 B2 * | 2/2005 | Gist et al. ................. | 62/81 |
| 7,007,493 B2 * | 3/2006 | Kadle et al. ............... | 62/244 |

* cited by examiner

Primary Examiner—William E. Tapolcai
(74) Attorney, Agent, or Firm—Pearne & Gordon LLP

(57) ABSTRACT

Vehicles are provided with a first air conditioning system adapted to condition at least air in the driver compartment and a second air conditioning system distinct from the first air conditioning system and adapted to operate independently of the first air conditioning system. The second air conditioning system is adapted to condition at least air in the sleeper compartment and includes an exterior assembly mounted to a location outside the interior area and an interior assembly operably connected with the exterior assembly and mounted within the interior area. The exterior assembly includes an auxiliary condenser coil and an auxiliary condenser fan and the interior assembly includes an auxiliary evaporator coil, an auxiliary evaporator fan and an auxiliary compressor. Air conditioning kits are also provided with an exterior assembly including a condenser fan and a condenser coil precharged with refrigerant fluid and an interior assembly including an evaporator fan, a compressor and an evaporator coil precharged with refrigerant fluid. Methods of installing an air conditioning system are also provided.

4 Claims, 4 Drawing Sheets

AIR CONDITIONING SYSTEM WITH INTERIOR AND EXTERIOR ASSEMBLIES

CROSS-REFERENCE TO RELATED APPLICATIONS

This application claims the benefit of U.S. Provisional Application No. 60/551,694 filed on Mar. 10, 2004, which is entirely incorporated herein by reference.

FIELD OF THE INVENTION

The present invention is directed in general to an air conditioning system, and is particularly directed to an air conditioning system including an exterior assembly and an interior assembly.

BACKGROUND OF THE INVENTION

Motor vehicles, such as a long distance or over the road trucks may not be configured to readily provide heating, ventilating, and air conditioning (HVAC) needs when parked. Specifically, such vehicles may not provide for a desired air handling, such as air conditioning, when the vehicles are not being driven. For example, if the vehicle is parked and conditioned air is desired, the engine of the vehicle, which drives the associated engine driven air-conditioning unit, may need to be operated. This results in air pollution, sound pollution, and engine wear concerns. As such, there is some need to address issues concerning air conditioning which is typically used when the vehicle is stationary.

Reconfiguring a vehicle to include HVAC equipment may be labor intensive and may require cutting, fitting, or other modification of existing parts. Space constraints within the vehicle may also be problematic.

SUMMARY OF THE INVENTION

In accordance with one aspect, the present invention provides a vehicle with an interior area including a driver compartment and a sleeper compartment. The vehicle further includes a first air conditioning system adapted to condition at least air in the driver compartment, a ground-engaging wheel, and a power source adapted to power the first air conditioning system and the ground-engaging wheel. The vehicle further includes a second air conditioning system distinct from the first air conditioning system and adapted to operate independently of the first air conditioning system. The second air conditioning system is adapted to condition at least air in the sleeper compartment and comprises an exterior assembly mounted to a location outside the interior area. The exterior assembly comprises an auxiliary condenser coil and an auxiliary condenser fan. The second air conditioning system further comprises an interior assembly operably connected with the exterior assembly and mounted within the interior area. The interior assembly comprises an auxiliary evaporator coil, an auxiliary evaporator fan and an auxiliary compressor.

In accordance with another aspect, the present invention provides an air conditioning kit comprising an exterior assembly including a condenser fan and a condenser coil precharged with refrigerant fluid and an interior assembly including an evaporator fan, a compressor and an evaporator coil precharged with refrigerant fluid. The precharged refrigerant fluid of the condenser coil is isolated from the precharged refrigerant fluid of the evaporator coil until subsequent operable connection of the exterior assembly with the interior assembly.

In accordance with still another aspect, the present invention provides an air conditioning system comprising an exterior assembly including a condenser fan, a condenser coil, a first inlet port and a first outlet port. The air conditioning system further includes an interior assembly including an evaporator fan, a compressor, an evaporator coil, a second inlet port and a second outlet port. The air conditioning system further includes at least one refrigerant line operably connecting the exterior assembly to the interior assembly by providing fluid communication between the first inlet port and the second outlet port and providing fluid communication between the first outlet port and the second inlet port.

In accordance with yet another aspect, the present invention also provides a method of installing an air conditioning system including the steps of providing a vehicle including an interior area, providing an exterior assembly including a condenser fan and a condenser coil precharged with refrigerant fluid and providing an interior assembly including an evaporator fan, a compressor and an evaporator coil precharged with refrigerant fluid. The method further includes the steps of mounting the exterior assembly to a location outside an interior area of the vehicle, mounting the interior assembly within the interior area of the vehicle, and operably connecting the interior assembly to the exterior assembly.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF EXAMPLE EMBODIMENTS

Figure 1:
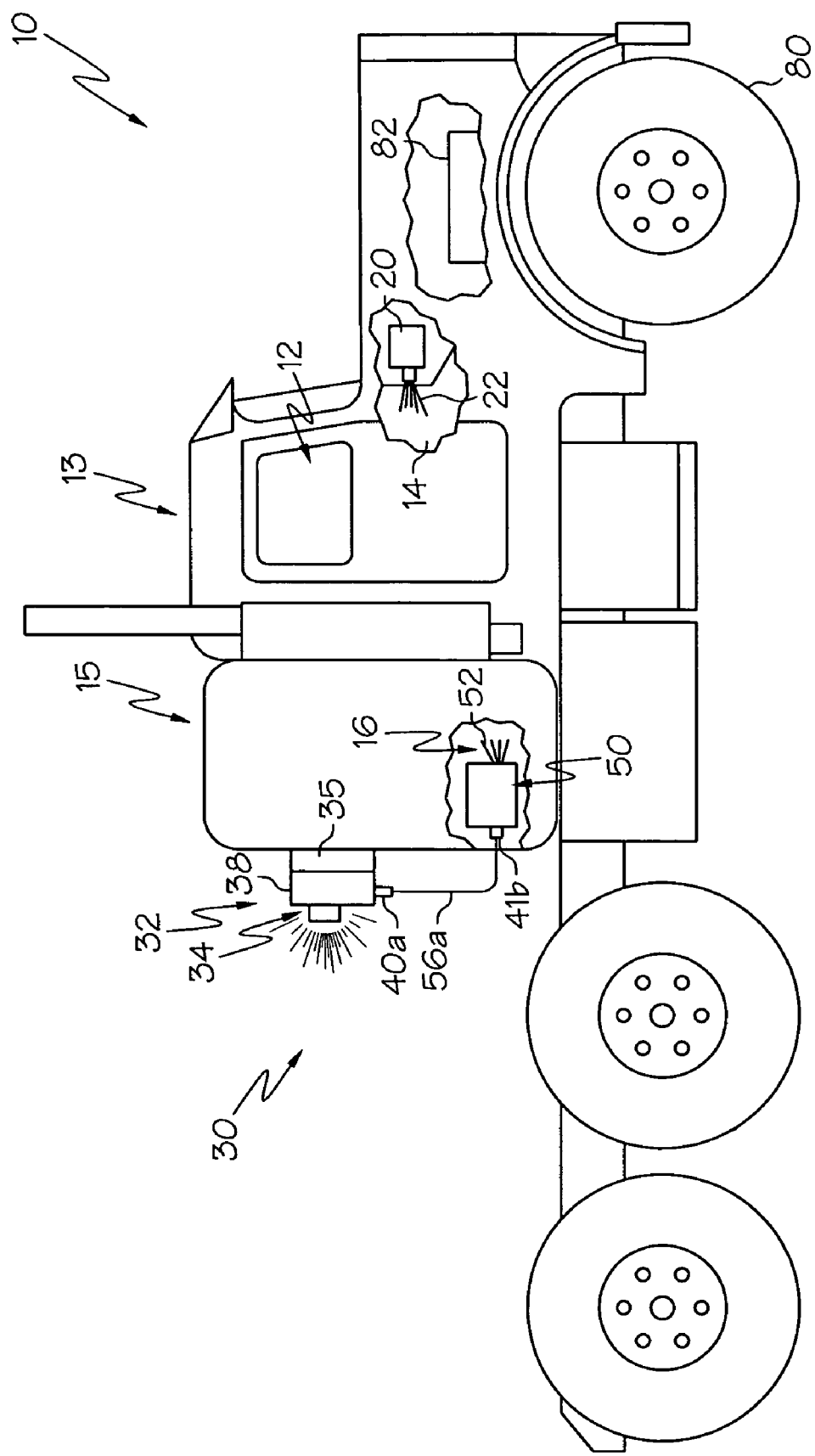
FIG. 1 is an elevational view of a truck with portions broken away to depict features of the present invention.

Certain terminology is used herein for convenience only and is not to be taken as a limitation on the present invention. Further, in the drawings, the same reference numerals are employed for designating the same elements, and in order to clearly and concisely illustrate the present invention, certain features may be shown in somewhat schematic form.

FIG. 1 depicts a vehicle 10 with portions broken away to depict features of an exemplary embodiment of the present invention. The vehicle 10 includes interior compartments for distinct air conditioning systems. As shown, the vehicle 10 includes an interior area 12 with a driver compartment 14 and a sleeper compartment 16. In particular embodiments, the vehicle 10 might comprise a truck with a driver cab 13 including the driver compartment 14 and a sleeper cab 15 including the sleeper compartment 16. A wide range of vehicles, in addition to trucks, might comprise driver and sleeper compartments. For example, a vehicle might comprise a recreational vehicle wherein the driver compartment comprises the front seat area of the recreational vehicle and the sleeper compartment comprises a rear living area of the recreational vehicle. Vehicles might also comprise an automobile where the driver compartment comprises the front seat area and the sleeper compartment comprises a rear seat or rear area of the automobile. Other vehicles including a driver compartment and one or more additional compartments might also incorporate concepts of the present invention.

Figure 4:
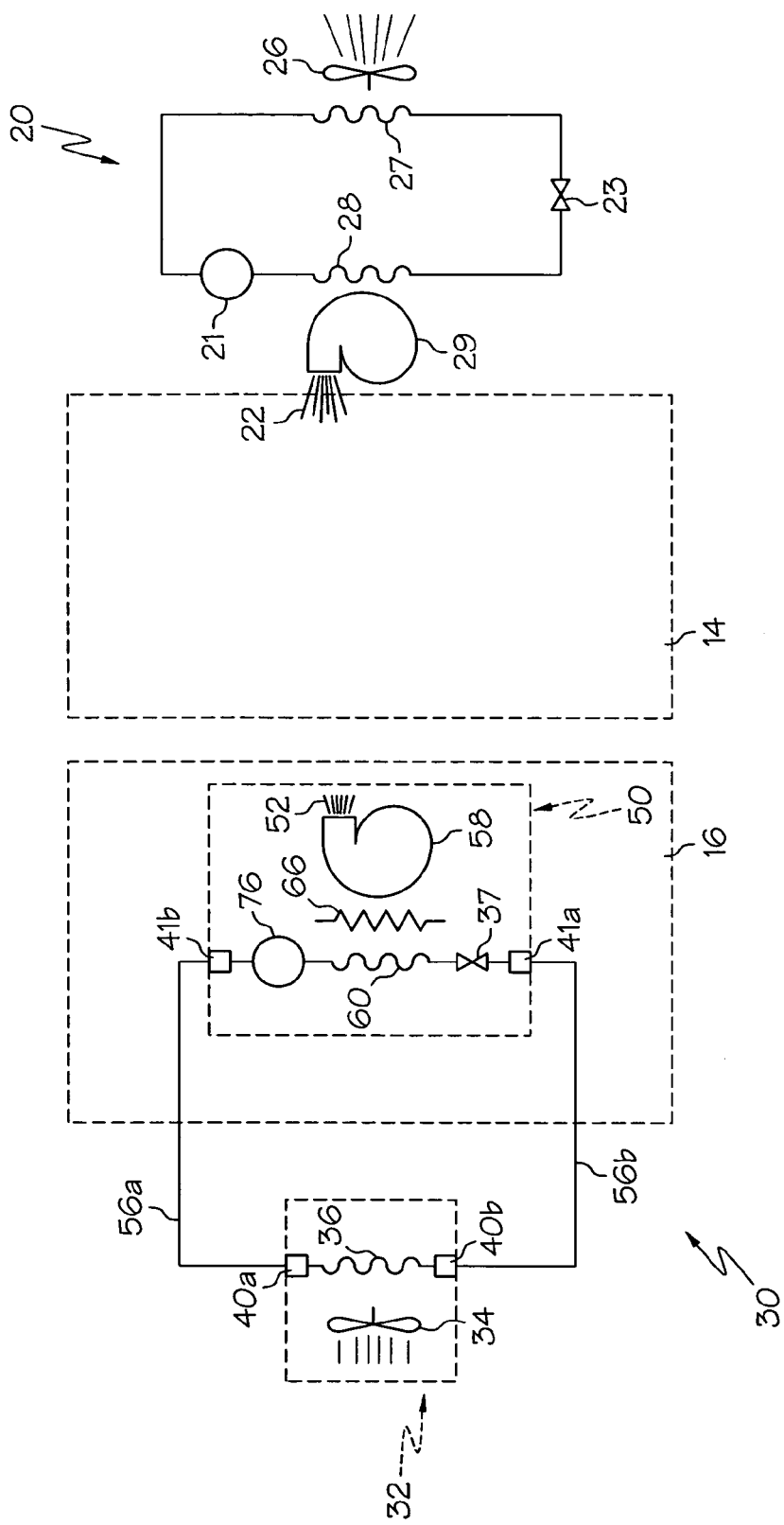
FIG. 4 is a schematic illustration of a second air conditioning system in accordance with the present invention that is distinct from a first air conditioning system.

The vehicle 10 can include a first air conditioning system that can comprise a wide variety of systems. As shown in FIGS. 1 and 4, the first air conditioning system 20 might include a compressor 21, a condenser coil 27, a condenser fan 26, an expansion valve 23, an evaporator coil 28 and an evaporator fan 29. The first air conditioning system 20 is adapted to condition (i.e., heat and/or cool) air at least in the driver compartment 14 of the vehicle. For example, the first air conditioning system 20 is adapted to produce conditioned air 22 that is directed into the driver compartment 14.

In certain embodiments, the driver compartment 14 is segregated from the sleeper compartment 16. For example, the compartments might be independent compartments that are permanently segregated from one another, or might comprise compartments or rooms that are selectively segregated from one another with a closure, such as doors, drapes, or the like. In embodiments where the driver compartment 14 is segregated from the sleeper compartment 16, the first air conditioning system 20 might only or substantially be adapted to condition air in the driver compartment 14. In other examples, the first air conditioning system 20 might condition air in the sleeper compartment 16 in addition to the driver compartment 14. For instance, in the absence of segregation between the driver compartment 14 and sleeper compartment 16, conditioned air 22 may diffuse into the sleeper compartment 16 or there might be significant heat transfer between the sleeper compartment 16 and driver compartment 14.

The vehicle further includes an engine adapted to power a ground engaging wheel and the first air conditioning system. For example, as apparent in partial schematic layout in FIG. 1, the exemplary vehicle 10 includes front pair of ground engaging wheels 80 and a power source 82 adapted to power the first air conditioning system 20 and the ground engaging wheels 80. While the illustrated power source 82 is adapted to power a pair of ground engaging wheels 80, the power source 82 might alternatively power a single wheel or three or more wheels in further embodiments.

A power source 82, such as a combustion engine, electric motor, or the like, can be used to power the ground engaging wheels 80 and can also simultaneously power the first air conditioning system 20. In one example, a battery provides direct power to the first air conditioning system 20 and the power source 82 recharges the battery such that the power source 82 indirectly provides power to the first air conditioning system 20. Fuel, such as electricity or combustible fuel or the like may be used to operate the power source 82. In a parked condition, the power source 82 is not needed to power the ground engaging wheels 80 but must remain in operation for continued operation of the first air conditioning system 20. For example, the power source 82 may be needed to recharge a battery providing direct power to the first air conditioning system 20. In certain applications, idle running of a power source when the vehicle is parked can cause excessive wear and tear, require undue fuel consumption, and/or present an environmental concern.

In order to provide comfort in the sleeper compartment 16, a second air conditioning system 30 is provided that does not necessarily rely on the power source 82 for power. Accordingly, air in the sleeper compartment 16 may be conditioned without running the power source 82 used to power the ground engaging wheels 80.

As shown in schematic form in FIGS. 1 and 4, the second air conditioning system 30 is distinct from the first air conditioning system 20 in that the air conditioning systems can include separate refrigeration circuits. Therefore, in exemplary embodiments, the refrigeration circuit of the first air conditioning system 20 may not be necessary to operate the second air conditioning system 30. Providing distinct air conditioning systems simplifies retrofit of existing vehicles to add a second air conditioning system for conditioning air at least in a sleeper compartment of the vehicle.

The second air conditioning system 30 is also adapted to operate independently of the first air conditioning system 20. Therefore, the second air conditioning system 30 can function without any input or assistance from the first air conditioning system 20. Accordingly, independent operation of the air conditioning systems allows the second air conditioning system 30 to operate whether or not any part of the first air conditioning system 20 is functioning. Independent operation provides advantages because one air conditioning system can be used without operating the other air conditioning system, thereby reducing power consumption and wear of components.

As shown schematically in FIG. 1, the second air conditioning system 30 is adapted to condition air at least in the sleeper compartment 16. For example, the second air conditioning system 30 includes conditioned air 52 that might be directed into the sleeper compartment 16. In situations where a closure segregates the driver compartment 14 from the sleeper compartment 16, the second air conditioning system 30 might only condition air in the sleeper compartment 16. In other examples, the second air conditioning system 30 might condition air in the driver compartment 14 in addition to the sleeper compartment 16. For example, in the absence of a closure, conditioned air 22 may diffuse into the driver compartment 14 or might cause heat transfer between the driver compartment 14 and sleeper compartment 16.

As further illustrated in FIG. 1, the second air conditioning system 30 includes an exterior assembly 32 and an interior assembly 50. The exterior assembly 32 can be mounted to a location outside the interior area 12 of the vehicle 10. For example, as shown in FIG. 1, the exterior assembly 32 can be mounted to a rear side of the sleeper cab 15. Although not shown, the exterior assembly 32 might be mounted to another side surface, a top surface or a bottom surface of the sleeper cab 15 or might be mounted at another location outside the interior area 12 of the vehicle 10.

Figure 2:
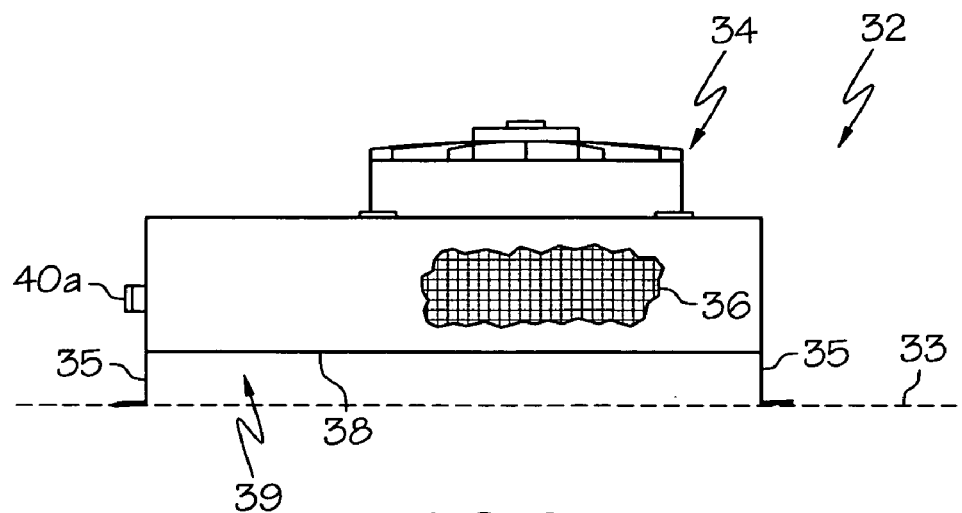
FIG. 2 is an elevational view of an exterior assembly in accordance with exemplary embodiments of the present invention.

As shown in FIGS. 2 and 4, the exterior assembly 32 comprises an auxiliary condenser coil 36 and an auxiliary condenser fan 34. The auxiliary condenser coil 36 may be positioned within an interior area of a housing 38. A portion of the housing 38 is broken away in FIG. 2 to illustrate the auxiliary condenser coil 36 located within the housing. One or more offset brackets 35 may be provided mount the auxiliary condenser coil 36 and auxiliary condenser fan 34 to a support surface 33 while offsetting the auxiliary condenser coil 36 from the support surface 33. Offsetting the auxiliary condenser coil 36 from the support surface 33 provides an offset space 39 that permits circulation of air between the auxiliary condenser coil 36 and the support surface 33.

The interior area of a vehicle is often limited and it is often desired to reduce components within the interior area to enlarge the available space within the vehicle. Accordingly, locating the auxiliary condenser coil 36 and the auxiliary condenser fan 34 outside the interior area 12, reduces interior area required to house the second air conditioning system. Therefore, a second air conditioning system might be installed in applications where the limited interior area available would otherwise prohibit installation of a secondary air conditioning system. Reducing the interior space requirements also frees additional interior space for other vehicle components that might not otherwise be installed due to excessive space requirements of a second air conditioning system mounted entirely within the interior area of the vehicle. Still further, a condenser fan can present a significant noise concern for the driver and other vehicle occupants. Therefore, locating the auxiliary condenser fan 34 outside the interior area 12 can significantly reduce the noise pollution within the interior area 12 of the vehicle.

Figure 3:
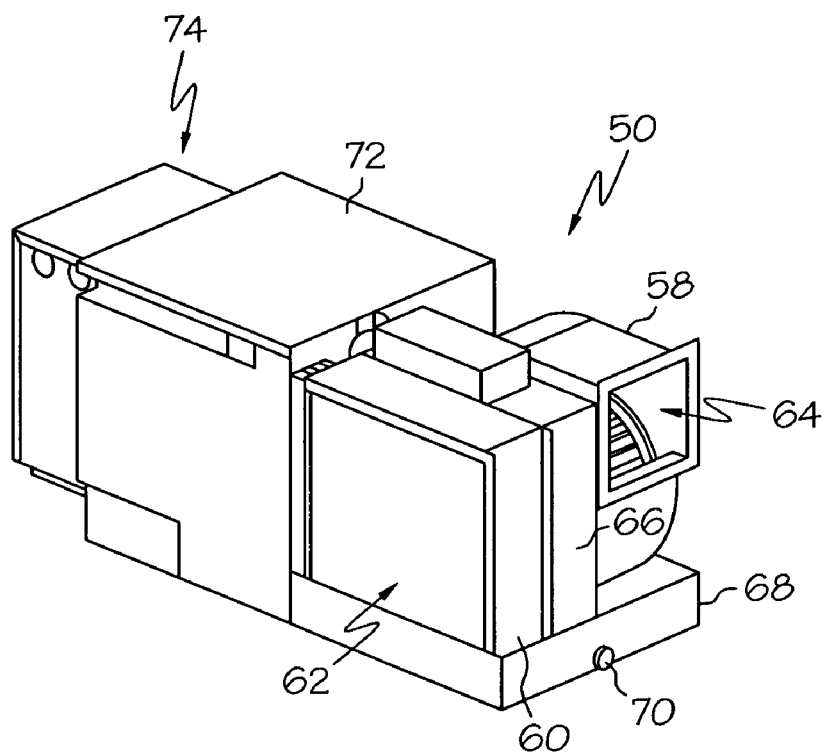
FIG. 3 is a perspective view of an interior assembly in accordance with exemplary embodiments of the invention.

The interior assembly 50 can be mounted within driver compartment 14 or the sleeper compartment 16 of the interior area 12 of the vehicle 10. In one particular embodiment, the interior assembly 50 might be mounted underneath a bed located in the sleeper compartment 16. A perspective view of an interior assembly 50 is shown in FIG. 3 and certain elements of the interior assembly 50 is shown in schematic form in FIG. 4. The interior assembly 50 includes an auxiliary compressor 76, an auxiliary evaporator coil 60 and an auxiliary evaporator fan 58. The evaporator fan 58 is designed to draw air through an inlet 62 and disperse conditioned air 52 through an outlet 64. An expansion device 37 such as an expansion valve, expansion capillary tube or the like is also provided. The expansion device 37 can be considered part of the auxiliary evaporator coil 60.

In certain embodiments, it can also be beneficial to provide the auxiliary evaporator coil 60, the auxiliary evaporator fan 58 and the compressor 76 as part of the interior assembly 50 to prevent an oversized exterior assembly. Indeed, including the evaporator coil 60, the evaporator fan 58 or the compressor 76 as part of the exterior assembly may result in an oversized exterior assembly that can not be incorporated in certain vehicle applications. In order to apply the second air conditioning system to a wide variety of vehicle applications, it can be important not to oversize the exterior assembly. Oversized exterior assemblies may present various installation obstacles and can increase air resistance of the vehicle. For example, an oversized exterior assembly may not fit underneath the lower wall of a sleeper cab 15. Locating an oversized exterior assembly on the roof of the sleeper cab 15 may increase the overall height of the truck above a maximum regulated height and can increase the air resistance of the vehicle. Moreover, it may not be possible to locate an oversized exterior assembly behind the sleeper cab 15 due to interference with other portions of the vehicle (e.g., a truck trailer).

Figure 5:
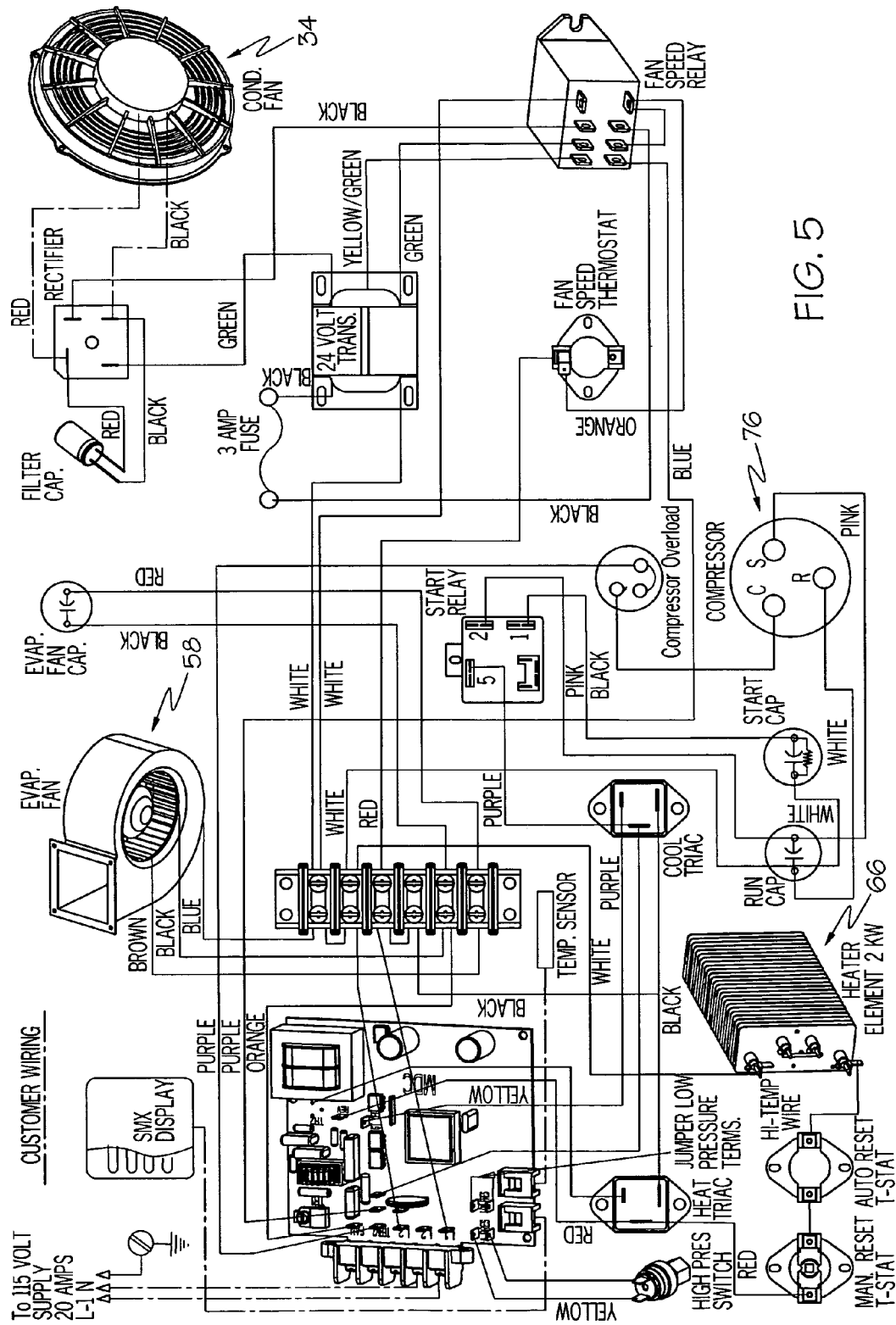
FIG. 5 is a schematic illustration of a wiring diagram of a second air conditioning system of the present invention.

The interior assembly 50 can further comprise an optional heating element 66, such as an electric heater, to allow the second air conditioning system 30 to provide heat without requiring waste heat from the power source 82. As shown in FIG. 3, a compressor housing 72 might be provided to protect the compressor and other components of the interior assembly 50. An electric box 74 may also be provided to house certain electrical components of the second air conditioning system 30. The electric box 74 may be attached to other components of the second air conditioning system 30, such as the compressor housing 72. Alternatively, the electric box 74 might be mounted at an alternative location away from other components of the second air conditioning system 30. A schematic illustration of a wiring diagram of components of the second air conditioning system is illustrated in FIG. 5. As further shown in FIG. 3, the interior assembly 50 can include a drip pan 68 with a drain 70 to collect and appropriately dispense condensed water from the evaporator coil 60.

In order to simplify installation, the interior and/or exterior assembly can comprise low loss quick connect inlet and outlet ports. A low loss quick connect port can comprise any joint, fitting or portion thereof that facilitates fluid connection and/or disconnection between two conduits without significant leakage of fluid to and/or from the conduits during the connection and/or disconnection process. As shown in FIG. 4, the exterior assembly 32 can comprise a first low loss quick connect inlet port 40*a* and a first low loss quick connect outlet port 40*b*. Similarly, the interior assembly 50 can comprise a second low loss quick connect inlet port 41*a* and a second low loss quick connect outlet port 41*b*.

A low loss quick connect line can also be used to operably connect the exterior assembly to the interior assembly. A low loss quick connect line can comprise any conduit adapted to connect with at least two fluid ports without significant leakage of fluid during connection and/or disconnection of the low loss quick connect line with the ports. For example, the second air conditioning system 30 can include a first low loss quick connect line 56*a* and a second low loss quick connect line 56*b* to operably connect the exterior assembly 32 to the interior assembly 50. The first low loss quick connect line 56*a* can operably connect the first low loss quick connect inlet port 40*a* of the exterior assembly 32 with the second low loss quick connect outlet port 41*b* of the interior assembly 50. Similarly, the second low loss quick connect line 56*b* can operably connect the second low loss quick connect inlet port 41*a* of the interior assembly 50 with the first low loss quick connect outlet port 40*b* of the exterior assembly 32.

In further embodiments, the first low loss quick connect line 56*a* and the second low loss quick connect line 56*b* can comprise a single overall line, the exterior assembly can comprise an overall port including both the low loss quick connect inlet and outlet ports of the exterior assembly, and the interior assembly can comprise an overall port including both the low loss quick connect inlet and outlet ports of the interior assembly. In one particular exemplary embodiment, the single overall line can comprise a coaxial line with the first low loss quick connect line being coaxially aligned with the second quick connect line. Providing a single overall line may simplify operable connection of the interior assembly and the exterior assembly while minimizing the chance of potential refrigerant fluid loss. Indeed, a single overall line would only involve two connection steps, rather than four connection steps in applications where the first and second low loss quick connect lines are separate from one another.

Installation of the second air conditioning system 30 may be further simplified by providing the exterior and interior assembly as a kit with respective condenser and evaporator coils including precharged refrigerant fluid. Precharging the coils with refrigerant fluid reduces installation time and possible environmental spills during installation procedures. Prior to installation, the second air conditioning system may also be tested and optimized without requiring discharge of refrigerant material that might otherwise be necessary in applications that do not include precharged coils. Discharge of refrigerant material also requires additional preparation time and increases the likelihood of inadvertent leakage to the environment.

An exemplary method of preparing an exemplary air conditioning kit will now be described. An exterior assembly 32 is provided with a condenser fan 34 and a condenser coil 36. An interior assembly 50 is also provided with an evaporator fan 58, a compressor 76 and an evaporator coil 60. The condenser coil 36 and the evaporator coil 60 can then be independently or simultaneously charged with refrigerant fluid prior to operable connections of the interior and exterior assemblies. Alternatively, the exterior assembly 32 may be operably connected to the interior assembly 50 prior to charging the system with refrigerant fluid. Once operably connected, the evaporator coil 60 and the condenser coil 36 may be simultaneously charged with a single charging step. If desired, the second air conditioning system 30 may then be tested and optimized to obtain the desired specifications. The exterior assembly 32 and the interior assembly 50 may then be disconnected from one another while the respective condenser coil 36 and evaporator coil 60 remains charged. The use of low loss quick connect inlet and outlet ports and low loss quick connect lines may also further simplify providing a kit with precharged condenser and evaporator coils such that the precharged refrigerant fluid of the condenser coil is isolated from the precharged refrigerant fluid of the evaporator coil until subsequent operable connection of the exterior assembly with the interior assembly during installation procedures.

From the above description of the invention, those skilled in the art will perceive improvements, changes and modifications. Such improvements, changes and modifications within the skill of the art are intended to be covered by the appended claims.

What is claimed is:

1. An air conditioning kit comprising:
   an exterior assembly including a condenser fan and a condenser coil precharged with refrigerant fluid, the exterior assembly further including a low loss quick connect inlet port and a low loss quick connect outlet port;
   an interior assembly including an evaporator fan, a compressor and an evaporator coil precharged with refrigerant fluid, the interior assembly further including a low loss quick connect inlet port and a low loss quick connect outlet port; and
   first and second low loss quick connect lines, the first low loss quick connect line for connection between the low loss quick connect inlet port of the exterior assembly and the low loss quick connect outlet port of the interior assembly, and the second low loss quick connect line for connection between the low loss quick connect inlet port of the interior assembly and the low loss quick connect outlet port of the exterior assembly;
   wherein the precharged refrigerant fluid of the condenser coil is isolated from the precharged refrigerant fluid of the evaporator coil until subsequent operable connection of the exterior assembly with the interior assembly by the use of the first and second low loss quick connect lines; and
   wherein the low loss quick connect ports and the low loss quick connect lines removably connect so that connection and disconnection can take place multiple times with low loss of the refrigerant fluid.

2. The kit of claim 1, wherein the kit is configured for use with a vehicle that has an exterior and an interior compartment, the exterior assembly being configured for location on the vehicle at the vehicle exterior and the interior assembly being configured for location within the interior compartment.

3. An air conditioning system comprising:
   an exterior assembly including a condenser fan, a condenser coil, a first low loss quick connect inlet port and a first low loss quick connect outlet port;
   an interior assembly including an evaporator fan, a compressor, an evaporator coil, a second low loss quick connect inlet port and a second low loss quick connect outlet port; and
   two low loss quick connect lines operably connecting the exterior assembly to the interior assembly by providing fluid communication between the first inlet port and the second outlet port and providing fluid communication between the first outlet port and the second inlet port,
   wherein the low loss quick connect ports and the low loss quick connect lines removably connect so that connection and disconnection can take place multiple times with low loss of the refrigerant fluid.

4. The air conditioning system of claim 3, wherein the system is on a vehicle that has an exterior and an interior compartment, and the exterior assembly is at the vehicle exterior and the interior assembly is within the interior compartment.

* * * * *